US012639677B2

(12) United States Patent
Scott-Green et al.

(10) Patent No.: US 12,639,677 B2
(45) Date of Patent: May 26, 2026

(54) METHODS, SYSTEMS, AND MEDIA FOR IDENTIFYING ABUSIVE CONTENT ITEMS

(71) Applicant: Google LLC, Mountain View, CA (US)

(72) Inventors: Henry Scott-Green, Marina Del Rey, CA (US); Silviu Bota, Horgen (CH); Christoph Renner, Rotkreuz (CH)

(73) Assignee: Google LLC, Mountain View, CA (US)

( * ) Notice: Subject to any disclaimer, the term of this patent is extended or adjusted under 35 U.S.C. 154(b) by 43 days.

(21) Appl. No.: 18/744,002

(22) Filed: Jun. 14, 2024

(65) Prior Publication Data

US 2024/0331060 A1 Oct. 3, 2024

Related U.S. Application Data

(63) Continuation of application No. 16/615,679, filed as application No. PCT/US2019/032064 on May 13, 2019, now Pat. No. 12,026,790.

(51) Int. Cl.
*G06Q 10/40* (2026.01)
*G06Q 30/018* (2023.01)
(Continued)

(52) U.S. Cl.
CPC ......... *G06Q 10/40* (2026.01); *G06Q 30/0185* (2013.01); *G06Q 50/265* (2013.01);
(Continued)

(58) Field of Classification Search
CPC ........... G06Q 10/063; G06Q 10/06311; G06Q 10/0631; G06Q 10/10; G06Q 30/0185;
(Continued)

(56) References Cited

U.S. PATENT DOCUMENTS

| | | | |
|---|---|---|---|
| 8,032,528 B2 | 10/2011 | Donovan et al. |
| 8,984,151 B1 | 3/2015 | Hsieh et al. |

(Continued)

FOREIGN PATENT DOCUMENTS

| | | |
|---|---|---|
| CN | 101611388 A | 12/2009 |
| JP | 2005070984 A | 3/2005 |

(Continued)

OTHER PUBLICATIONS

Chen, Hao, Susan McKeever, and Sarah Jane Delany. "A comparison of classical versus deep learning techniques for abusive content detection on social media sites." International conference on social informatics. Cham: Springer International Publishing, 2018. (Year: 2018).*

(Continued)

*Primary Examiner* — William S Brockington, III
(74) *Attorney, Agent, or Firm* — Shumaker & Sieffert, P.A.

(57) ABSTRACT

Methods, systems, and media for identifying abusive content items are provided. In some embodiments, the method comprises: receiving, at a server from a user device associated with a user, a request to provide user-generated content on a media content platform; in response to receiving the request, determining whether the user-generated content is to be reviewed by one or more reviewing users based on one or more bypass criterion; in response to determining that the user-generated content is to be reviewed based on the one or more bypass criterion, adding a review request to a queue of a reviewing user, wherein the review request includes the user-generated content and information associated with a user account corresponding to the user; and determining whether a decision responsive to the review request indicates that the user-generated content is to be provided on the media content platform, wherein: in response to determining (Continued)

that the decision indicates that the user-generated content item violates at least one policy associated with the media content platform, (i) a first message is transmitted to the user of the user device that indicates the at least one violated policy and a penalty to be administered to the user account corresponding to the user and (ii) a corresponding action is taken that inhibits the user-generated content from being provided on the media content platform; and in response to determining that the decision indicates that the user-generated content item does not violate the at least one policy associated with the media content platform, a second message is transmitted to the user of the user device that indicates that the user-generated content is eligible for providing on the media content platform.

20 Claims, 4 Drawing Sheets

(51) Int. Cl.

| | |
|---|---|
| *G06Q 50/26* | (2012.01) |
| *G06F 16/9536* | (2019.01) |
| *G06N 20/00* | (2019.01) |
| *G06Q 10/0631* | (2023.01) |
| *G06Q 10/10* | (2023.01) |

(52) U.S. Cl.
CPC .......... *G06F 16/9536* (2019.01); *G06N 20/00* (2019.01); *G06Q 10/06311* (2013.01); *G06Q 10/10* (2013.01)

(58) Field of Classification Search
CPC .... G06Q 30/018; G06Q 50/01; G06Q 50/265; G06F 16/9536; G06N 20/00
See application file for complete search history.

(56) References Cited

U.S. PATENT DOCUMENTS

| | | | |
|---|---|---|---|
| 10,306,068 B1 * | 5/2019 | Chadha | ............... H04M 3/5234 |
| 10,440,063 B1 | 10/2019 | Nevick et al. | |
| 2008/0172446 A1 | 7/2008 | Donovan et al. | |
| 2012/0016724 A1 | 1/2012 | Harrison et al. | |
| 2013/0097261 A1 * | 4/2013 | Baer | .................... H04L 51/212 |
| | | | 709/206 |
| 2013/0268589 A1 | 10/2013 | Torgersrud et al. | |
| 2014/0164277 A1 | 6/2014 | Good et al. | |
| 2014/0230053 A1 | 8/2014 | Mote et al. | |
| 2014/0365382 A1 | 12/2014 | Rubinstein et al. | |
| 2016/0088063 A1 | 3/2016 | Cahn et al. | |
| 2017/0257337 A1 | 9/2017 | Hampson et al. | |
| 2018/0082331 A1 | 3/2018 | Feldman et al. | |
| 2018/0089449 A1 | 3/2018 | Boudreau et al. | |
| 2018/0253661 A1 | 9/2018 | Strauss | |
| 2018/0349796 A1 * | 12/2018 | Gibbs | ................... H04L 63/104 |
| 2018/0352301 A1 * | 12/2018 | Tofighbakhsh | .... H04N 21/2668 |
| 2019/0139156 A1 | 5/2019 | Mehta et al. | |
| 2019/0146965 A1 | 5/2019 | Zack | |
| 2020/0090279 A1 | 3/2020 | Ginsberg et al. | |
| 2020/0364727 A1 | 11/2020 | Scott-Green et al. | |

FOREIGN PATENT DOCUMENTS

| | | |
|---|---|---|
| JP | 2008059445 A | 3/2008 |
| JP | 2008539491 A | 11/2008 |
| JP | 2010086352 A | 4/2010 |
| JP | 2014194808 A | 10/2014 |
| JP | 2017050022 A | 3/2017 |
| JP | 2017173881 A | 9/2017 |
| JP | 2019023925 A | 2/2019 |
| WO | 2006117626 A | 11/2006 |

OTHER PUBLICATIONS

Response to Office Action, and translation thereof, dated Apr. 10, 2025, from counterpart Korean Application No. 10-2021-7040305 filed May 9, 2025, 40 pp.

Notice of Intent to Grant, and translation thereof, from counterpart Chinese Application No. 201980096440.2 dated Apr. 21, 2025, 4 pp.

Office Action, and translation thereof, from counterpart Korean Application No. 10-2021-7040305 dated Apr. 10, 2025, 18 pp.

Response to Communication pursuant to Article 94(3) EPC dated Oct. 15, 2024, from counterpart European Application No. 19728562.0 filed Feb. 7, 2025, 12 pp.

First Office Action and Search Report, and translation thereof, from counterpart Chinese Application No. 201980096440.2 dated Jun. 21, 2024, 17 pp.

Chen, H., McKeever, S., & Delany, S. J. (2018). A comparison of classical versus deep learning techniques for abusive content detection on social media sites doi :http://dx.doi .org/10.1007/978-3-030-01129-1_8 (Year: 2018).

Daro et al., "How YouTube's "Super Chat" System Is Pushing Video Creators Toward More Extreme Content", Buzzfeed News, May 17, 2018, 12 pp., URL: https://www.buzzfeednews.com/article/ishmaeldaro/youtube-comments-hate-speech-racist-white-nationalists-super.

Examination Report dated May 2, 2022 in IN Patent Application No. 202147056984.

International Preliminary Report on Patentability from International Application No. PCT/US2019/032064 dated Nov. 16, 2021, 7 pp.

International Search Report and Written Opinion of International Application No. PCT/US2019/032064 dated Nov. 7, 2019, 9 pp.

Intimation of Grant from counterpart Indian Application No. 202147056984, dated May 31, 2024, 1 pg.

Notice of Intent to Grant from counterpart Japanese Application No. 2021-568081 dated May 7, 2024, 3 pp.

Office Action dated Mar. 6, 2023 in JP Patent Application No. 2021-568081.

Office Action dated Sep. 25, 2023 in JP Patent Application No. 2021-568081.

Prosecution History from U.S. Appl. No. 16/615,679, dated Jul. 30, 2021 through Feb. 22, 2024, 288 pp.

Response to Communication Pursuant to Rules 161(1) and 162 EPC dated Dec. 22, 2021, from counterpart European Application No. 19728562.0, filed Jun. 28, 2022, 16 pp.

Response to First Examination Report dated May 2, 2022, from counterpart Indian Application No. 202147056984 filed Oct. 31, 2022, 11 pp.

Communication pursuant to Article 94(3) EPC from counterpart European Application No. 19728562.0 dated Oct. 15, 2024, 8 pp.

Response to First Office Action, and translation thereof, dated Jun. 21, 2024, from counterpart Chinese Application No. 201980096440.2 filed Oct. 21, 2024, 40 pp.

Notice of Intent to Grant, and translation thereof, from counterpart Japanese Application No. 2024-091357 dated Aug. 22, 2025, 5 pp.

Notice of Intent to Grant, and translation thereof, from counterpart Korean Application No. 10-2021-7040305 dated Oct. 24, 2025, 4 pp.

Summons to Attend Oral Proceedings Pursuant to Rule 115(1) EPC from counterpart European Application No. 19728562.0 dated Jan. 21, 2026, 10 pp.

Written Submissions from counterpart European Application No. 19728562.0 filed Apr. 7, 2026, 94 pp.

\* cited by examiner

200

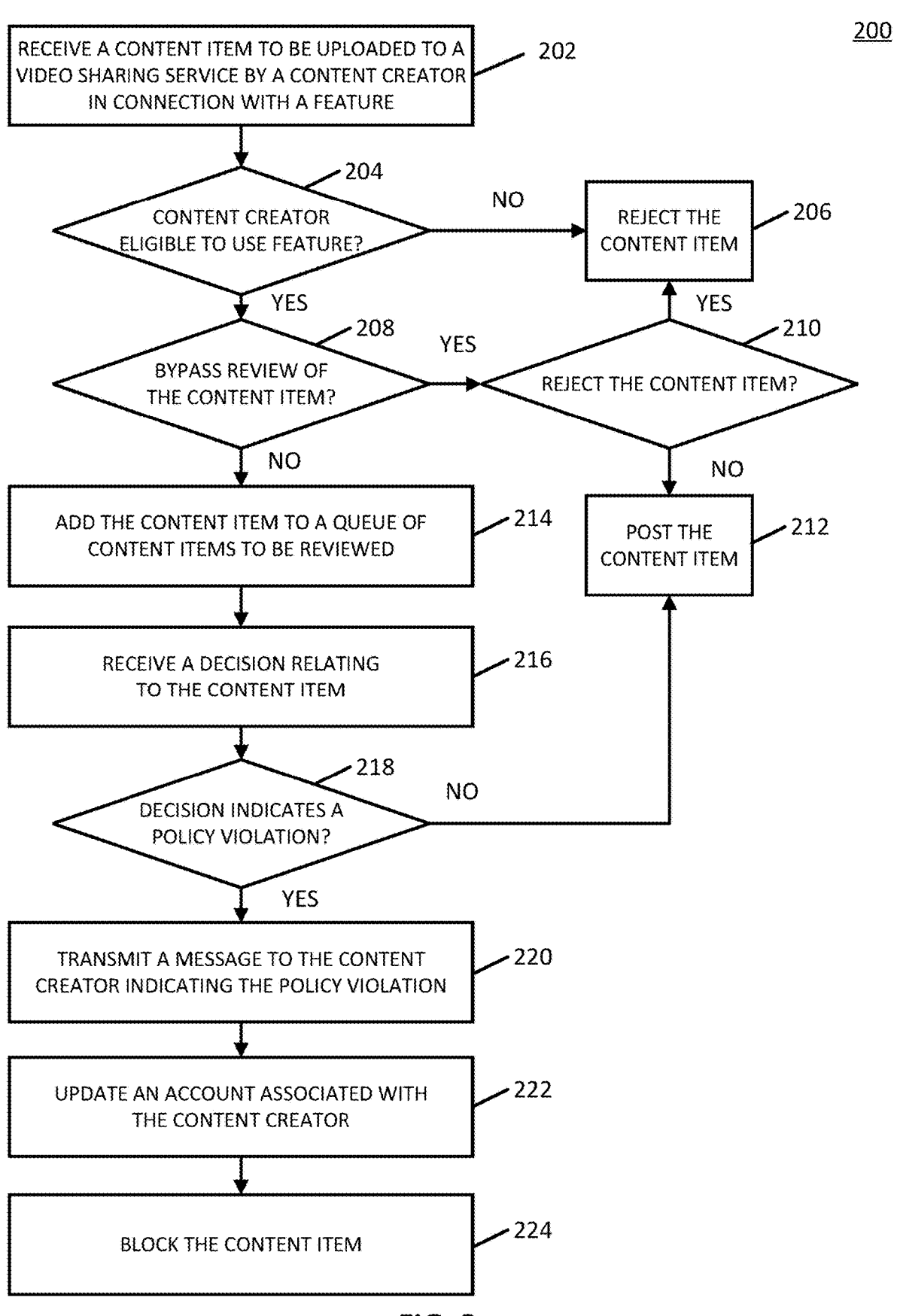

RECEIVE A CONTENT ITEM TO BE UPLOADED TO A VIDEO SHARING SERVICE BY A CONTENT CREATOR IN CONNECTION WITH A FEATURE — 202

CONTENT CREATOR ELIGIBLE TO USE FEATURE? — 204

NO

REJECT THE CONTENT ITEM — 206

YES

BYPASS REVIEW OF THE CONTENT ITEM? — 208

YES

REJECT THE CONTENT ITEM? — 210

YES

NO

NO

ADD THE CONTENT ITEM TO A QUEUE OF CONTENT ITEMS TO BE REVIEWED — 214

POST THE CONTENT ITEM — 212

RECEIVE A DECISION RELATING TO THE CONTENT ITEM — 216

DECISION INDICATES A POLICY VIOLATION? — 218

NO

YES

TRANSMIT A MESSAGE TO THE CONTENT CREATOR INDICATING THE POLICY VIOLATION — 220

UPDATE AN ACCOUNT ASSOCIATED WITH THE CONTENT CREATOR — 222

BLOCK THE CONTENT ITEM — 224

FIG. 2

METHODS, SYSTEMS, AND MEDIA FOR IDENTIFYING ABUSIVE CONTENT ITEMS

RELATED APPLICATION

This application is continuation of U.S. application Ser. No. 16/615,679, filed Nov. 21, 2019, the entire contents which are incorporated herein by reference.

TECHNICAL FIELD

The disclosed subject matter relates to methods, systems, and media for identifying abusive content items. More particularly, the disclosed subject matter relates to determining whether user-generated content should be manually reviewed by one or more reviewers or whether manual review of the user-generated content can be bypassed based on one or more criterion and determining whether the user-generated content is abusive content such that a corresponding action can be taken on the user-generated content.

BACKGROUND

Media content platforms have become the primary mechanism by which users discover and share digital media content. For example, a content creator may upload a video or other content item that the content creator has created to a media content platform, which can then make the uploaded content item available to viewers (e.g., by streaming the content item, by downloading the content item, etc.).

While many user-generated channels on a media content platform contain original, non-abusive content, there can be abusive content that violates a policy of the media content platform, such as misleading, repetitive, racy, pornographic, infringing, and/or "clickbait" content, and that targets unsuspecting users. For example, a particular content item may include objectionable content, such as violent content, objectionable language, adult content, drug-related content, gambling content, etc. that the media content platform may want to remove or otherwise prevent its users from accessing. As another example, a media content platform may want to block particular features of the service from being used (e.g., features that allow a content creator to collect revenue, and/or any other suitable features) with content items that violate these particular policies.

However, it can be difficult to identify content items that violate policies. For example, while a service may use human reviewers to manually review uploaded content items, it can be time-intensive to review each and every piece of uploaded content to identify policy violations. In such cases, a content item may be available on a media content platform for any number of days or weeks before a manual review process indicates that the content item should be blocked or removed due to a policy violation of the media content platform.

Accordingly, it is desirable to provide new methods, systems, and media for identifying abusive content items.

SUMMARY

Methods, systems, and media for identifying abusive content items are provided.

In accordance with some embodiments of the disclosed subject matter, a method for identifying abusive content items is provided, the method comprising: receiving, from a user device associated with a user, a request to provide user-generated content on a media content platform; in response to receiving the request, determining whether the user-generated content is to be reviewed by one or more reviewing users based on one or more bypass criterion; in response to determining that the user-generated content is to be reviewed based on the one or more bypass criterion, adding a review request to a queue of a reviewing user, wherein the review request includes the user-generated content and information associated with a user account corresponding to the user; and determining whether a decision responsive to the review request indicates that the user-generated content is to be provided on the media content platform, wherein: in response to determining that the decision indicates that the user-generated content item violates at least one policy associated with the media content platform, (i) a first message is transmitted to the user of the user device that indicates the at least one violated policy and a penalty to be administered to the user account corresponding to the user and (ii) a corresponding action is taken that inhibits the user-generated content from being provided on the media content platform; and, in response to determining that the decision indicates that the user-generated content item does not violate the at least one policy associated with the media content platform, a second message is transmitted to the user of the user device that indicates that the user-generated content is eligible for providing on the media content platform.

In some embodiments, the user is a content creator and the request to provide user-generated content includes an upload request to store the user-generated content on a storage device associated with the media content platform.

In some embodiments, the user is a content creator and the request to provide user-generated content includes an initiation request to start a livestream using the media content platform.

In some embodiments, the user is a viewer and the request to provide user-generated content includes a content feature that interacts with a content creator.

In some embodiments, the method further comprises determining whether the user is eligible to provide the user-generated content on the media content platform by: calculating a risk score that indicates a risk associated with the user account of the user based on other user-generated content that has been previously provided to the media content platform; and comparing the risk score with a threshold risk score that corresponds to a content type of the of the user-generated content, wherein the user is deemed eligible to provide the user-generated content based on the comparison of the risk score with the threshold risk score.

In some embodiments, the method further comprises determining whether the user is eligible to provide the user-generated content on the media content platform based on audience information associated with the user account of the user.

In some embodiments, the method further comprises determining whether the user is eligible to provide the user-generated content on the media content platform based on location information associated with the user account of the user.

In some embodiments, the method further comprises determining whether the user is eligible to provide the user-generated content on the media content platform based on enforcement actions for previous policy violations that are associated with the user account.

In some embodiments, the method further comprises determining whether the user is eligible to provide the user-generated content on the media content platform by transmitting a second review request to the queue of the reviewing user, where the second review request includes information associated with the user account corresponding to the user and prompts the reviewing user to determine whether the information associated with the user account violates at least one policy associated with the media content platform.

In some embodiments, the method further comprises, in response to receiving the request to provide the user-generated content on the media content platform, causing a timing indication to be presented that indicates when the decision responsive to the review request is to be provided.

In some embodiments, the method further comprises: receiving a flag from a viewer of the user-generated content on the media content platform, where the flag indicates a potential policy violation; and, in response to receiving the subsequent review request, adding a subsequent review request to the queue of the reviewing user that previously reviewed the user-generated content, where the subsequent review request includes the user-generated content and the flag from the viewer and where the user-generated content is restricted from being provided on the media content platform until a decision responsive to the subsequent review request is received.

In some embodiments, determining whether the user-generated content is to be reviewed by one or more reviewing users based on one or more bypass criterion further comprises: identifying second user-generated content that is similar to the user-generated content, wherein the second user-generated content has been previously reviewed; and determining that the user-generated content is not to be reviewed by the one or more reviewing users based on a similarity of the user-generated content to the second user-generated content. In some embodiments, the method further comprises: determining that the second user-generated content was previously restricted from being made available on the media content platform; and, in response to determining that the second user-generated content was previously restricted from being made available on the media content platform, performing the corresponding action that inhibits the user-generated content from being made available on the media content platform, wherein the first message indicates the restriction based on the second user-generated content.

In some embodiments, determining whether the user-generated content is to be reviewed by the one or more reviewing users further comprises determining whether at least one of the user-generated content and content related to the user-generated content has been previously flagged by a threshold number of viewers.

In some embodiments, the method further comprises updating the user account associated with the user to indicate the at least one policy associated with the media content platform violated by the user-generated content.

In some embodiments, the penalty to be administered to the user account corresponding to the user is based on a number of previous policy violations by the content creator.

In some embodiments, the penalty to be administered to the user account corresponding to the user based on a severity of the at least one policy associated with the media content platform violated by the user-generated content.

In some embodiments, the method further comprises: receiving, from the user device, an appeal request of the decision, wherein the appeal request includes appeal text; adding the appeal request that includes the appeal text and the user-generated content to the queue of a second reviewing user that is different from the reviewing user that provided the decision indicating that the user-generated content is to be restricted from being provided on the media content platform; receiving, from a user device associated with the second reviewing user, an appeal decision corresponding to the appeal request; and determining at least one corresponding action to be performed on the user-generated content based on the decision and the appeal decision.

In some embodiments, in response to determining that the decision indicates that the user-generated content item does not violate the at least one policy associated with the media content platform, the second message indicates a time that the user-generated content is automatically made available on the media content platform.

In accordance with some embodiments of the disclosed subject matter, a system for identifying abusive content items is provided, the system comprising a memory and a hardware processor that, when executing computer executable instructions stored in the memory, is configured to: receive, from a user device associated with a user, a request to provide user-generated content on a media content platform; in response to receiving the request, determine whether the user-generated content is to be reviewed by one or more reviewing users based on one or more bypass criterion; in response to determining that the user-generated content is to be reviewed based on the one or more bypass criterion, add a review request to a queue of a reviewing user, wherein the review request includes the user-generated content and information associated with a user account corresponding to the user; and determine whether a decision responsive to the review request indicates that the user-generated content is to be provided on the media content platform, wherein: in response to determining that the decision indicates that the user-generated content item violates at least one policy associated with the media content platform, (i) a first message is transmitted to the user of the user device that indicates the at least one violated policy and a penalty to be administered to the user account corresponding to the user and (ii) a corresponding action is taken that inhibits the user-generated content from being provided on the media content platform; and, in response to determining that the decision indicates that the user-generated content item does not violate the at least one policy associated with the media content platform, a second message is transmitted to the user of the user device that indicates that the user-generated content is eligible for providing on the media content platform.

In accordance with some embodiments of the disclosed subject matter, a non-transitory computer-readable medium containing computer executable instructions that, when executed by a processor, cause the processor to perform a method for identifying abusive content items, the method comprising: receiving, from a user device associated with a user, a request to provide user-generated content on a media content platform; in response to receiving the request, determining whether the user-generated content is to be reviewed by one or more reviewing users based on one or more bypass criterion; in response to determining that the user-generated content is to be reviewed based on the one or more bypass criterion, adding a review request to a queue of a reviewing user, wherein the review request includes the user-generated content and information associated with a user account corresponding to the user; and determining whether a decision responsive to the review request indicates that the user-generated content is to be provided on the media content platform, wherein: in response to determining that the decision indicates that the user-generated content item violates at least one policy associated with the media content platform, (i) a first message is transmitted to the user of the user device that indicates the at least one violated policy and a penalty to be administered to the user account corresponding to the user and (ii) a corresponding action is taken that inhibits the user-generated content from being provided on the media content platform; and, in response to determining that the decision indicates that the user-generated content item does not violate the at least one policy associated with the media content platform, a second message is transmitted to the user of the user device that indicates that the user-generated content is eligible for providing on the media content platform.

In accordance with some embodiments of the disclosed subject matter, a system for identifying abusive content items is provided, the system comprising: means for receiving, from a user device associated with a user, a request to provide user-generated content on a media content platform; means for determining whether the user-generated content is to be reviewed by one or more reviewing users based on one or more bypass criterion in response to receiving the request; means for adding a review request to a queue of a reviewing user in response to determining that the user-generated content is to be reviewed based on the one or more bypass criterion, wherein the review request includes the user-generated content and information associated with a user account corresponding to the user; and means for determining whether a decision responsive to the review request indicates that the user-generated content is to be provided on the media content platform, wherein: in response to determining that the decision indicates that the user-generated content item violates at least one policy associated with the media content platform, (i) a first message is transmitted to the user of the user device that indicates the at least one violated policy and a penalty to be administered to the user account corresponding to the user and (ii) a corresponding action is taken that inhibits the user-generated content from being provided on the media content platform; and, in response to determining that the decision indicates that the user-generated content item does not violate the at least one policy associated with the media content platform, a second message is transmitted to the user of the user device that indicates that the user-generated content is eligible for providing on the media content platform.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 2 shows an illustrative example of a process for identifying abusive content items in accordance with some embodiments of the disclosed subject matter.

DETAILED DESCRIPTION

Figure 1:
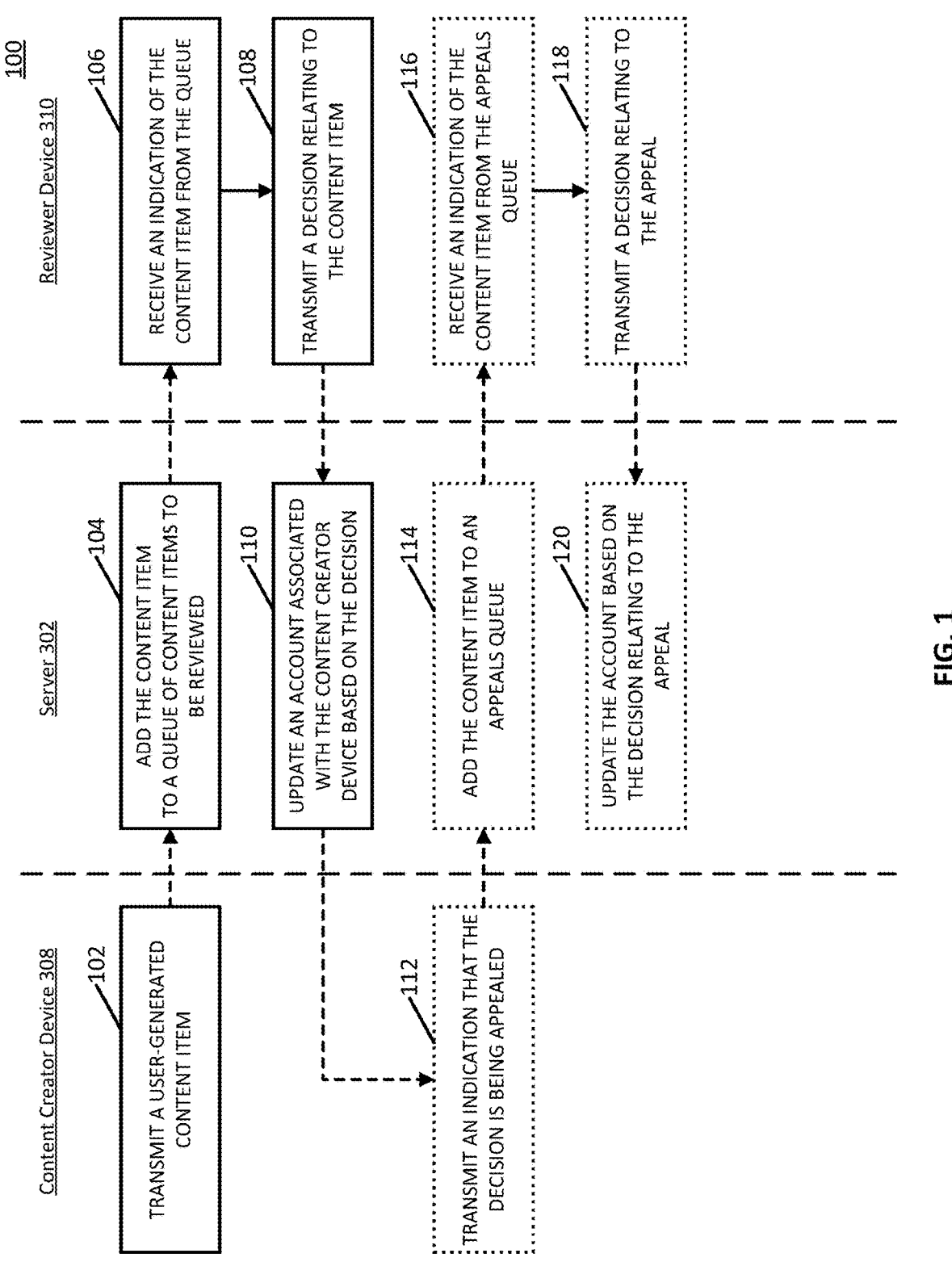
FIG. 1 shows an illustrative example of an information flow diagram for identifying abusive content items in accordance with some embodiments of the disclosed subject matter.

In accordance with various embodiments, mechanisms (which can include methods, systems, and media) for identifying abusive content items are provided. More particularly, the disclosed subject matter relates to determining whether user-generated content should be manually reviewed by one or more reviewers or whether manual review of the user-generated content can be bypassed based on one or more criterion and determining whether the user-generated content is abusive content such that a corresponding action can be taken on the user-generated content.

Prior abusive content detection systems typically allow user-generated content to be published or otherwise made available prior to such content being reviewed, which introduces a great amount of risk. The mechanisms disclosed herein can provide a multi-stage abuse mitigation approach that inhibits user-generated content from being made available on a media content platform, for example, without requiring human review of each piece of content while ensuring that user-generated content that does not meet one or more bypass criterion is manually reviewed.

In some embodiments, the mechanisms described herein can receive a content item that is a user-generated content item from a creator of the content item. The user-generated content item can include, for example, any suitable type of user-generated content, such as a video content item or an audio content item generated by a content creator, a comment entered by a viewer of media content in connection with an online chat or a comments section, use of a content feature to generate user-generated content, and/or any other suitable type of user-generated content. It should be noted that user-generated content can include any suitable content, such as video content, audio content, textual content, live streamed video content, etc.

In some embodiments, the mechanisms can determine whether the content item is to be manually reviewed by one or more reviewers. In some embodiments, in response to determining that the user-generated content is to be manually reviewed, the mechanisms can add the user-generated content to a queue of content items to be reviewed by a reviewer (e.g., a reviewing user at a suitable computing device). In some embodiments, a reviewer can then receive the user-generated content from the queue of content items and can review the user-generated content to determine if the user-generated content violates a policy of the media content platform. For example, in some embodiments, the reviewer can determine whether the user-generated content includes any particular types of objectionable content (e.g., violent content, objectionable language, hate speech, adult content, and/or any other suitable type of objectionable content). In some embodiments, the reviewer can then transmit a decision indicating whether the user-generated content violates any policies of the media content platform. In some embodiments, the mechanisms can then determine whether the content item is to be posted to the media content platform in connection with the feature.

It should be noted that, in some embodiments, the mechanisms can, in response to receiving a decision from a first reviewer indicating that the user-generated content violates a policy of the media content platform, add the user-generated content to another queue of content items to be reviewed by a different reviewer (e.g., a verification reviewer, a reviewer having more experience than the initial reviewer, etc.). In continuing this example, a corresponding action, such as removing the user-generated content from the media content platform or otherwise inhibiting the user-generated content from being made available on the media content platform, can be taken in response to receiving decisions from the first reviewer and the second, different reviewer both indicating that the user-generated content violates a policy of the media content platform.

In some embodiments, the mechanisms can determine whether the content item is to be manually reviewed based on any suitable information. For example, in some embodiments, the mechanisms can determine whether the content item is to be manually reviewed based on information associated with the content creator, such as whether the content creator has previously uploaded content items that have been approved, whether the content creator has previously uploaded content items that have violated policies of the media content platform, and/or any other suitable information associated with the content creator. As another example, in some embodiments, the mechanisms can determine whether the content item is to be manually reviewed based on a similarity of the content item to previously reviewed content items. As a more particular example, in some embodiments, the mechanisms can determine that the content item is similar to a previously rejected content item and can determine that the uploaded content item is also to be rejected. In some embodiments, the mechanisms can determine criteria used to determine if content items are to be added to a queue of items to be manually reviewed based on a number of received content items, thereby allowing an amount of manual review that is assigned to be adjusted.

In some embodiments, in an instance in which a review of a content item indicates that the content item violates a policy of the media content platform, the mechanisms can cause a message to be transmitted to the content creator that indicates any suitable information. For example, in some embodiments, the message can indicate a policy that was violated, timestamp information indicating a portion of the content item that violates the policy, a penalty for the policy violation, and/or any other suitable information. Note that, in some embodiments, the mechanisms can determine the penalty based on any suitable information, such as a number of previous violations by the content creator, a severity of the violation, and/or any other suitable information. Additionally, in some embodiments, the mechanisms can cause the content item to be blocked from the media content platform and/or removed from the media content platform.

In some embodiments, in response to determining that the user-generated content or the use of a feature for generating user-generated content is allowable (e.g., in response to a reviewer determining that the content does not violate a policy of the media content platform, in response to a determination that the content is likely to not violate a policy of the media content platform, etc.), the mechanisms can transmit a specific time in which the user-generated content is posted or otherwise made available on the media content platform (e.g., rather than publishing or posting the user-generated prior to any review for violation of one or more policies of the media content platform, rather than a delay after publishing or posting the content in which a review of the content is submitted, etc.). Alternatively, the mechanisms can transmit a specific time in which the user-generated content can be posted or published at the direction of the content creator.

In some embodiments, the mechanisms can receive an appeal of a decision from a content creator. In some such embodiments, the mechanisms can add the appeal to a queue of appeals, and the appeal can be assigned to a reviewer. In some embodiments, any suitable information can be provided to a reviewer of the appeal, such as the content item, information associated with the original decision that is being appealed (e.g., information indicating the policy that was violated, timing information indicating portions of the content item that violated the policy, and/or any other suitable information), text from the content creator (e.g., an argument from the content creator, and/or any other suitable text), and/or any other suitable information. In some embodiments, a decision related to the appeal can then cause the original decision to be upheld or, conversely, can cause the original decision to be overturned. In instances in which the original decision is overturned, and in which the content item had previously been blocked, the mechanisms can cause the content item to be made available on the media content platform.

Note that, in some embodiments, a content item can be received from a content creator in which the content item is to be provided in connection with use of a feature by the content creator. For example, in some embodiments, the content item can be a media content item received by a media content platform for providing to viewers in connection with a particular feature. As a more particular example, in some embodiments, the feature can include providing a membership service to viewers of a channel of content associated with the media content platform, where membership can allow members to access any suitable perks associated with memberships (e.g., access to special content, access to a chat room or forum with other members, access to custom emojis or badges, and/or any other suitable perks). As another more particular example, in some embodiments, the feature can include allowing a content creator to provide merchandise (e.g., branded apparel, and/or any other suitable branded merchandise) associated with the content item and/or associated with a channel of content to which the content item belongs. Additional details regarding features are described below in more detail in connection with FIG. 2. In some such embodiments, the mechanisms can determine whether the content item is to be manually reviewed to determine whether the content item is eligible to be provided to users in connection with use of the feature. For example, in some embodiments, the mechanisms can determine whether the content creator is eligible to use the feature, determine whether the content item is to be manually reviewed, determine whether the content item is to be blocked from being provided in connection with the feature, etc., as described below in more detail in connection with FIG. 2.

In a more particular example, prior to making user-generated content available on a media content platform, the mechanisms can use human reviewers and machine reviewers to determine whether a user account is eligible to access media content platform features to generate user-generated content. This can, for example, restrict access to media content platform features to user accounts that have been evaluated as being clean or non-abusive user accounts.

Note that, in some embodiments, content items as referred to herein can refer to any suitable type of user-generated content, such as media content generated and uploaded by a content creator, an offer of a membership perk offered by a content creator in exchange for purchase of a membership associated with a channel of content produced by the content creator, comments entered by viewers of content on a comments section or social networking post, and/or any other suitable type of content. That is, in some embodiments, the mechanisms described herein can be used to determine whether any suitable type of user-generated content is to be manually reviewed, for example, prior to posting the user-generated content in a particular page, forum, comments section, etc. For example, the mechanisms described herein can be used to review comments (e.g., comments submitted on a comment section associated with a content item, comments submitted in a chat forum, comments submitted on a social networking post, and/or any other suitable comments). As a more particular example, in some embodiments, the mechanisms described herein can be used to determine whether a particular comment is to be added to a queue of comments to be manually reviewed or to determine whether a comment is to be deleted. As another example, in some embodiments, the mechanisms described herein can be used to review perks offered by a content creator in connection with membership to a channel of content provided by the content creator. As a more particular example, in some embodiments, the mechanisms described herein can be used to determine whether a particular perk offered by a content creator is to be added to a queue of perks to be manually reviewed and/or to determine whether the particular perk is to be cancelled (e.g., due to violating any particular policy associated with the media content platform).

Turning to FIG. 1, an illustrative example 100 of an information flow diagram for identifying abusive content items is shown in accordance with some embodiments of the disclosed subject matter. As illustrated, in some embodiments, blocks of process 100 can be perform on a content creator device 308, a server 302, and/or a reviewer device 310, as shown in and described below in connection with FIG. 3.

At 102, content creator device 308 can transmit a user-generated content item to server 302. In some embodiments, the user-generated content item can include any suitable type of content, such as a video, a playlist of videos, a link to a live stream of a video, an image, an animation, a photo, a slideshow of photos, a document, and/or any other suitable type of content. In a more particular example, content creator device 308 can upload the user-generated content item for publishing with a channel associated with a user account of a video sharing service. As another example, in some embodiments, the user-generated content item can include a comment submitted by a user of content creator device 308 to be posted in a chat room, a live chat, in a comments section associated with a particular page, media content item, or social networking post, and/or any other suitable type of comment. In some embodiments, content creator device 308 can transmit the user-generated content item in connection with a user account associated with content creator device 308 (e.g., a user account on a media content platform associated with server 302, and/or any other suitable user account). Note that, in some embodiments, server 302 can be associated with a media content platform that hosts uploaded content and that streams or otherwise provides content hosted by the media content platform to one or more user devices.

It should be noted that, in some embodiments, in response to receiving the user-generated content item, server 302 can determine whether the user-generated content item is to be reviewed by one or more reviewing users. In turn, server 302 can cause a notification or other suitable interface to be presented on content creator device 308 that indicates the user-generated content item or access to a feature for generating user-generated content is being reviewed. For example, the notification can indicate a particular amount of time until a decision from a reviewer is received. In another example, the notification can indicate that an updated notification will be presented upon approval of the user-generated content, thereby providing the content creator at content creator device 308 with the control of publishing or otherwise making the user-generated content available on the media content platform.

At 104, server 302 can add the content item to a queue of content items to be reviewed. In some embodiments, the queue of content items can correspond to a queue of content items that are to be manually reviewed by human reviewers, and/or reviewed in any other suitable manner. In some embodiments, server 302 can maintain the queue in any suitable manner. For example, in some embodiments, content items can be added to the queue based on a time at which the content item is received by server 302 (e.g., such that items that are received later are placed at a later point in the queue, and/or in any other manner). As another example, in some embodiments, content items can be added to the queue based on information associated with a content creator associated with content creator device 308. As a more particular example, in some embodiments, server 302 can determine a popularity of the content creator (e.g., based on a number of subscribers to a channel of content associated with the content creator, based on a number of views of content generated by the content creator, and/or based on any other suitable information) and can place the content item in the queue based on the popularity of the content creator (e.g., a content item received from a relatively more popular content creator can be inserted at a relatively higher position within the queue, and/or in any other suitable manner). In some embodiments, server 302 can maintain the queue of content items based on any suitable combination of factors.

Note that, as described below in more detail in connection with block 208 of FIG. 2, in some embodiments, server 302 can determine whether the content item is to be added to the queue. In some embodiments, server 302 can add the content item to the queue of content items to be reviewed in response to determining that the content item is to be reviewed. Alternatively, in some embodiments, server 302 can determine that the user-generated content item meets one or more bypass criterion such that the user-generated content item is not to be reviewed and is not to be added to a queue of content items to be reviewed at 104. In some such instances, server 302 can determine whether the user-generated content item is to be posted or removed (or otherwise inhibited from being made available on the media content platform) using any suitable technique or combination of techniques, as described below in more detail in connection with blocks 208 and 210 of FIG. 2. For example, in some embodiments, server 302 can determine that the user-generated content item is substantially similar (e.g., a threshold amount of similarity) to previously approved user-generated content and, in response, can allow the user-generated content to be made available on the media content platform. In another example, in some embodiments, server 302 can determine that the user-generated content is substantially similar (e.g., a threshold amount of similarity) to previously removed user-generated content and, in response, can automatically flag, remove, or otherwise inhibit the user-generated content from being provided on the media content platform without transmitting the user-generated content to one or more reviewers.

It should be noted that, in some embodiments, server 302 can receive an indication, such as a flag from any suitable user of the media content platform, that user-generated content may violate a policy of the media content platform (e.g., for containing objectionable content within the user-generated content). In response to receiving such an indication, server 302 can add the user-generated content to the queue of content items to be reviewed by one or more reviewers (e.g., a reviewing user at a suitable computing device). This can, for example, ensure that user-generated content is reviewed by one or more reviewers.

At 106, reviewer device 310 can receive an indication of the content item from the queue. In some embodiments, reviewer device 310 can receive the indication in any suitable manner. For example, in some embodiments, reviewer device 310 can receive the indication via a user interface through which a user of reviewer device 310 views a content item and transmits a decision related to the content item (e.g., a decision indicating that the content item violates a particular policy associated with a media content platform, a decision indicating that the content item does not violate any policies associated with a media content platform, and/or any other suitable decision). As a more particular example, in some embodiments, reviewer device 310 can receive a notification that indicates that the content item has reached the top of the queue of items to be reviewed and/or that the content item is being assigned to a user of reviewer device 310 for review. In some such embodiments, the notification can include any suitable information, such as a link to the content item, a name of a content creator associated with content creator device 308, a topic associated with the content item, information associated with the content creator (e.g., a number of previously uploaded and/or approved content items created by the content creator, a number of times content previously uploaded by the content creator has been associated with a policy violation, and/or any other suitable information), and/or any other suitable information.

Note that, in some embodiments, a user of reviewer device 310 can select the content item based on the indication in any suitable manner (e.g., by selecting a link presented in the indication, and/or in any other suitable manner), which can cause the content item to be presented in a video player window or any other suitable user interface on reviewer device 310.

At 108, reviewer device 310 can transmit a decision relating to the content item. For example, in some embodiments, the decision can indicate any suitable information relating to the content item, such as whether the content item includes content that violates one or more policies associated with a media content platform to which the content item was uploaded. As a more particular example, in some embodiments, the policies can include any suitable policies, such as the content item including violent content, sexual content, abusive language, hate speech, and/or any other suitable type of objectionable content.

In some embodiments, the transmitted decision can include any suitable information, such as an indication of a type of objectionable content included in the content item, an indication of one or more portions of the content item that include the objectionable content (e.g., based on timestamps of a video, frames of a video, and/or in any other suitable manner), and/or any other suitable information. Note that, in some embodiments, the decision can indicate that the content item does not violate any policies.

At 110, server 302 can update an account associated with the content creator device based on the decision received from reviewer device 310. For example, in an instance in which the decision indicates that the content item violates a particular policy, server 302 can update a tally that indicates a number of times the content creator has uploaded content that violates a policy associated with the media content platform. As another example, in an instance in which the decision indicates that the content item does not violate a particular policy, server 302 can update a tally that indicates a number of times the content creator has uploaded content that does not violate any policies associated with the media content platform (that is, a number of times the content creator has uploaded content that has been approved by a reviewer).

In some embodiments, the decision can then be viewed by a user of content creator device 308. For example, in some embodiments, the user of content creator device 308 can log into a user account associated with content creator device 308 and the media content platform and can view the decision in a user interface associated with the user account. In another example, in response to the decision indicating that the user-generated content or the use of a feature for generating user-generated content is allowable (e.g., in response to a reviewer determining that the content does not violate a policy of the media content platform, in response to a determination that the content is likely to not violate a policy of the media content platform, etc.), the decision can be presented on content creator device 308 along with a specific time in which the user-generated content is posted or otherwise made available on the media content platform (e.g., rather than publishing or posting the user-generated prior to any review for violation of one or more policies of the media content platform, rather than a delay after publishing or posting the content in which a review of the content is submitted, etc.). Alternatively, in some embodiments, the decision can be presented along with a specific time in which the user-generated content can be posted or published at the direction of the content creator.

It should be noted that, in some embodiments, in response to the reviewer providing a decision in which the user-generated content is deemed to violate a policy of the media content platform, server 302 can add the content to a queue of content items to be reviewed by another reviewer. It should also be noted that, in some embodiments, the additional reviewer can be a different reviewer having more experience in comparison with the reviewer that provided the initial decision. In such an embodiment, server 302 can remove or otherwise inhibit the user-generated content from being provided by the media content platform in response to receive two negative decisions indicating that the user-generated content violates a policy of the media content platform from two different reviewers.

In some embodiments, the decision can be appealed by a user of content creator device 308. For example, in some embodiments, the decision can be appealed in an instance in which the user of content creator device 308 disagrees with the decision (e.g., in an instance in which the decision indicates that the content item includes a particular type of objectionable content and/or violates a particular policy and in which the user disagrees, and/or in any other suitable instance). In some embodiments, blocks 112-118 as shown in FIG. 1 and described below can be executed in an instance in which the decision is appealed. In some embodiments, blocks 112-118 can be omitted in an instance in which the decision is not appealed.

At 112, content creator device 308 can transmit an indication that the decision is being appealed. In some embodiments, content creator device 308 can transmit the indication in any suitable manner. For example, in some embodiments, a user of content creator device 308 can select any suitable button or user interface control associated with the decision that, when selected, cause a user interface for entering any suitable text associated with an appeal of the decision (e.g., any suitable reasons contesting the decision, and/or any other suitable text). In some such embodiments, the text associated with the appeal of the decision can be transmitted in connection with the indication that the decision is being appealed to server 302.

At 114, server 302 can add the content item to an appeals queue. In some embodiments, the content item can be added to the appeals queue in any suitable manner. For example, in some embodiments, the content item can be added to the appeals queue based on a time at which the indication that the decision is being appealed was transmitted by content creator device 308 at 112. As another example, in some embodiments, the content item can be added to the appeals queue based a relative popularity of the content creator associated with the content item, as described above in connection with block 104.

At 116, reviewer device 310 can receive an indication of the content item from the appeals queue. In some embodiments, reviewer device 110 can receive the indication of the content item in any suitable manner. For example, in some embodiments, reviewer device 110 can present a notification that indicates that a decision associated with the content item is being appealed by a content creator associated with the content item.

In some embodiments, a user of reviewer device 310 can select the indication in any suitable manner, and, in some embodiments, selection of the indication can cause the content item to be presented on reviewer device 310 in connection with any suitable information associated with the decision and/or any suitable information associated with the appeal. For example, in some embodiments, the information can include text associated with the appeal (e.g., as described above in connection with block 110), information associated with the decision that is being appealed (e.g., information indicating the objectionable content or the policy violation indicated in the decision, information indicating timestamps at which particular objectionable content is indicated as presented in the decision, and/or any other suitable information), and/or any other suitable information).

Note that, although FIG. 1 shows the same device (that is, reviewer device 310) as both reviewing the content item at 106 and reviewing an appeal of the content item at 116, in some embodiments, two different reviewer devices can be used. That is, in some embodiments, a different reviewer can review an appeal of a decision than a reviewer that transmitted the decision that is being appealed. For example, a different reviewer at a different reviewer device can be used to review the user-generated content in the appeals queue, where the different reviewer is designated as having more experience than the initial reviewer that provided the negative decision and where an action, such as suspending a user account or inhibiting the presentation of the user-generated content, can be taken in response to both the initial reviewer and the different appeals reviewer providing negative decisions.

At 118, reviewer device 310 can transmit a decision related to appeal of the content item. In some embodiments, the decision can indicate any suitable information, such as that a user of reviewer device 310 agrees with the decision being appealed, that a user of reviewer device 310 disagrees with the decision being appealed, and/or any other suitable information.

At 120, server 302 can update the account associated with the content creator based on the decision related to the appeal. For example, in an instance in which the decision being appealed indicated that the content item violates a particular policy, and in which the decision related to the appeal disagrees with the decision being appealed, server

302 can update the account to reflect the disagreement between the two decisions. As a more particular example, in some embodiments, server 302 can decrement a tally of a number of times the content creator has uploaded content items that violate policies associated with the media content platform. As another example, in an instance in which the decision related to the appeal confirms the decision being appealed that the content item violates a particular policy, server 302 can perform any suitable action(s), such as blocking the content item, prohibiting content creator device 308 from uploading content items for a predetermined duration of time (e.g., for a month, for ninety days, and/or any other suitable duration of time), and/or any other suitable actions. Additional details on actions that can be performed by server 302 are described below in connection with block 224 of FIG. 2.

Turning to FIG. 2, an illustrative example 200 of a process for identifying abusive content is shown in accordance with some embodiments of the disclosed subject matter. In some embodiments, blocks of process 200 can be executed on a server, such as a server associated with a media content platform that hosts content items uploaded by one or more content creators.

Process 200 can begin at 202 by receiving, from a content creator, a content item to be uploaded or posted in connection with a media content platform. For example, in some embodiments, the content item can be a video content item or an audio content item created by the content creator that is to be uploaded the media content platform and made available for viewing by other users of the media content platform. As another example, in some embodiments, the content item can be a comment submitted by a viewer of a content item hosted by the media content platform. As a more particular example, in some embodiments, the comment can be a comment submitted by a viewer in connection with a chat room or live chat associated with a particular channel of content, a comment submitted by a viewer to be posted in a particular comments section (e.g., a comments section associated with a particular media content item hosted by the media content platform, and/or any other suitable comments section), and/or any other suitable comment. As yet another example, in some embodiments, the content item can be a perk that is being offered via the media content platform by a content creator in connection with a channel of content created by the content creator. As a more particular example, the perk can be an offer of a particular type of content (e.g., exclusive video content, behind-the-scenes content, apparel or other goods, and/or any other suitable type of content) that will be provided by the content creator in exchange for users purchasing memberships or subscriptions to the channel of content.

In some embodiments, the uploaded content item can be uploaded in connection with a particular feature of the media content platform, for example, a feature the content creator is interested in using to generate user-generated content. In some embodiments, the feature can include features associated with comments or messages that can be transmitted by viewers of the content item. For example, in some embodiments, the feature can be related to comments in a comment section associated with the comment item and/or comments posted in a live chat associated with the content item. As a more particular example, the feature can include allowing a viewer of the content item to purchase a "super chat," which can allow the viewer to pin a comment associated with the purchased "super chat" to a particular location in a chat or comments section (e.g., at the top of a live chat, in a top position of a comments section, and/or in any other suitable location). Continuing with this example, in some embodiments, the feature can include determining a duration of time a "super chat" comment is to be pinned to the particular location based on an amount of payment paid by the viewer who purchased the "super chat." As another more particular example, in some embodiments, the feature can include allowing a viewer of the content item to purchase a "super sticker" that allows the viewer to include an animated image or icon in a comments section or live chat associated with the content item. Continuing with this example, in some embodiments, the feature can include pinning particular "super sticker" images or icons at a particular location of a live chat or comments section in response to determining that any particular criteria have been met (e.g., that the viewer paid more than a predetermined amount for the "super sticker," and/or any other suitable criteria). Note that, in some embodiments, animated images or icons that are available for selection to a viewer of a content item can be curated in any suitable manner, for example, generated and made available by the content creator, by the media content platform, and/or by any other suitable entity. As yet another more particular example, in some embodiments, the feature can include allowing a viewer of the content item to purchase a "super thanks." In some such embodiments, purchase of a "super thanks" by a viewer can cause a selected animated image or icon (e.g., selected by the viewer of the content item in connection with purchase of the "super thanks") to be presented in connection with the content item and/or can cause any suitable proportion of a payment by the viewer to be shared with the content creator.

Note that, in some embodiments, the feature can allow the content creator to receive any suitable proportion of revenue from a purchased "super chat," "super sticker," and/or "super thanks." For example, in some embodiments, the content creator can receive a proportion of the revenue from purchased options, and the media content platform can receive the remainder of the revenue. Additionally or alternatively, in some embodiments, the feature can allow the content creator to specify any suitable charitable organization to receive a proportion of the revenue.

In some embodiments, the feature can allow the content creator to offer a membership service to viewers of content created by the content creator. For example, in some embodiments, the membership service can allow viewers who purchase a membership to receive any suitable perks in connection with content created by the content creator. In some embodiments, the perks can include any suitable special offers available to viewers who purchase memberships, such as access to special or exclusive content created by the content creator (e.g., only available to viewers who purchase memberships), access to exclusive emojis or other animated icons that can be included in chat messages or comments sections associated with content created by the content creator, access to exclusive chat forums where viewers who have purchased memberships can chat with other viewers who have also purchased memberships, and/or any other suitable special offers available to members.

In some embodiments, the feature can allow the content creator to offer merchandise through the media content platform. For example, in some embodiments, the feature can allow the content creator to include links to merchandise (e.g., apparel, mugs or cups, artwork, and/or any other suitable merchandise) in a page which presents the content item or other content provided by the content creator through the media content platform. As a more particular example, the feature can allow the content creator to include links to one or more goods which are available for purchase in a video watch page which presents the content item. As another more particular example, the feature can allow the content creator to include links to one or more goods which are available for purchase in a page associated with a channel of content associated with the content creator.

In some embodiments, the feature can allow the content creator to offer one or more links to purchase tickets for a live show associated with the content creator. For example, in an instance in which the content item is a music video associated with a particular band or other musical group, the feature can allow links to purchase tickets for a concert associated with the band or musical group to be presented in a page in which the content item is presented (e.g., below a video player window in which the content item is presented, and/or in any other suitable location). Note that, in some embodiments, the feature can allow links to purchase tickets to be presented in connection with any other suitable page or content, such as a page associated with a channel of content created by the content creator, and/or any other suitable content.

At 204, process 200 can determine whether the content creator is eligible to use the feature for generating user-generated content. In some embodiments, process 200 can determine whether the content creator is eligible to use the feature based on any suitable information and using any suitable technique(s). For example, in some embodiments, process 200 can determine whether the content creator is eligible to use the feature based on content items the content creator has previously uploaded to the media content platform. As a more particular example, in some embodiments, process 200 can use any suitable classifier or machine learning technique to determine a risk score that indicates a likelihood that the content creator is likely to upload video content that includes one or more types of objectionable content based on previously uploaded content items. As a specific example, process 200 can determine that a content creator with a risk score below a predetermined threshold is not eligible to use the feature. As another specific example, in some embodiments, process 200 can determine that a content creator with a risk score above a predetermined threshold is eligible to use the feature. As another more particular example, in some embodiments, process 200 can determine a number of times the content creator has previously violated one or more policies associated with the media content platform (e.g., policies that prohibit particular types of objectionable content, and/or any other suitable policies). As a specific example, in some embodiments, process 200 can determine that a content creator who has violated one or more policies of the media content platform more than a predetermined threshold number of times (e.g., more than once, more than twice, more than once in the past month, and/or any other suitable number of times) is not eligible to use the feature.

As another example, in some embodiments, process 200 can determine whether the content creator is eligible to use the feature based on information associated with the content creator, such as a size of the audience of the content creator and/or a location associated with the content creator. As a more particular example, in some embodiments, process 200 can determine that content creators with a relatively small audience are not eligible to use the feature. As another more particular example, in some embodiments, process 200 can determine that content creators with a relatively large audience are eligible to use the feature. In some embodiments, a size of an audience can be determined based on any suitable information, such as a total number of views of content items previously uploaded by the content creator, an average number of views of content items previously uploaded by the content creator, a number of subscribers to a channel of content created by the content creator, and/or any other suitable metric.

As yet another example, in some embodiments, process 200 can determine whether the content creator is eligible to use the feature based on a manual review of content posted by the content creator. As a more particular example, in some embodiments, a human reviewer can review one or more content items previously posted by the content creator and/or the content item uploaded by the content creator as described above in connection with block 202 and can determine whether the content item(s) violate one or more policies of the media content platform. In some embodiments, in response to determining that the content item(s) violate one or more policies of the media content platform, process 200 can determine that the content creator is not eligible to use the feature.

As still another example, in some embodiments, process 200 can determine whether the content creator is eligible to use the feature based on any other suitable information associated with the content creator and/or associated with content items associated with the content creator. As a more particular example, in some embodiments, process 200 can determine whether the content creator has been previously approved to join a program associated with the media content platform that allows the content creator to use particular features associated with membership in the program. As another more particular example, in some embodiments, process 200 can determine whether an age of the content creator is greater than a predetermined age (e.g., more than 18, and/or more than any other suitable age). As yet another more particular example, process 200 can determine whether content items associated with the content creator are associated with particular genres (e.g., content that is age-restricted, content that is targeted at children, music video content, and/or any other suitable genres of content). As a specific example, in some embodiments, process 200 can determine that the content creator is not eligible to use the feature if content items associated with the content item typically belong to particular genres, such as age-restricted content, content targeted at children, music video content, etc.

As still another example, in some embodiments, process 200 can determine whether the content creator is eligible to use the feature based on a determination of whether viewers of content created by the content creator are satisfied or dissatisfied by use of the feature by the content creator. As a more particular example, in some embodiments, in an instance in which the feature includes providing perks to viewers who purchase memberships associated with content produced by the content creator, process 200 can determine whether users who have purchased membership are generally satisfied or dissatisfied with their purchase. As another more particular example, in some embodiments, in an instance in which the feature includes allowing viewers to purchase a pinned comment, a pinned animated image, or other message or chat content, process 200 can determine whether users who have purchased pinned message or chat content are generally satisfied or dissatisfied with their purchase. In some embodiments, process 200 can determine viewer satisfaction metrics in any suitable manner. For example, in some embodiments, process 200 can determine a number of viewers or a proportion of viewers who have cancelled a membership, a number of viewers or a proportion of viewers who have left a negative review of an offered perk, a number of viewers or a proportion of viewers who have unsubscribed from a channel of content produced by the content creator, and/or any other suitable satisfaction metric. In some embodiments, process 200 can determine that the content creator is not eligible to use the feature in response to determining that a calculated satisfaction metric is below a predetermined threshold. As another example, in some embodiments, process 200 can determine that the content creator is not eligible to use the feature in response to determining that more than a predetermined proportion of viewers (e.g., more than 10%, more than 20%, and/or any other suitable proportion) have canceled a purchased membership or left a negative review in connection with an offered perk or purchase option.

Note that, in an instance in which the content item corresponds to a submitted comment, process 200 can determine whether a user who submitted the comment is eligible to post a comment to a particular chat or particular comments section. For example, in an instance in which the comment is submitted in connection with a chat or comments section that requires a subscription to a particular channel of content of the media content platform or that requires any other suitable criteria be met, process 200 can determine whether the user who submitted the comment is a subscriber to the channel of content or satisfies any other suitable criteria. Additionally or alternatively, in some embodiments, in instances in which the content item corresponds to a submitted comment, block 204 can be omitted.

Additionally, note that, in some embodiments, process 200 can determine whether the content creator is eligible to use the feature based on any suitable combination of information. For example, in some embodiments, process 200 can determine whether the content creator is eligible to use the feature based on a combination of a risk score associated with the content creator, information indicating a size of an audience of the content creator, information indicating previous violations of policies by the content creator, and/or a manual review of content item(s). In some embodiments, process 200 can combine the information in any suitable manner. For example, in some embodiments, process 200 can assign a score to each item of information and can determine an aggregate score associated with the content creator based on the score for each item of information. In some embodiments, process 200 can then determine if the content creator is eligible to use the feature based on a determine of whether the aggregate score associated with the content creator exceeds a predetermined threshold.

If, at 204, process 200 determines that the content creator is not eligible to use the feature ("no" at 204), process 200 can proceed to 206 and can reject the content item. In some embodiments, process 200 can reject the content item in any suitable manner. For example, in some embodiments, process 200 can block upload of the content item to a server associated with the media content platform. As another example, in some embodiments, process 200 can transmit a message to the content creator and/or cause a notification to be presented on a user device associated with the content creator that indicates that the content item has been rejected. In some such embodiments, the message and/or the notification can include any suitable information, such as a reason the content item has been rejected (e.g., due to previous violations by the content creator of one or more policies associated with the media content platform, and/or any other suitable reason). As yet another example, in some embodiments, in an instance in which the content item corresponds to a comment to be posted to a chat or a comments section, process 200 can inhibit the comment from being posted to the chat or the comments section.

Note that, in some embodiments, in response to determining that the content creator is not eligible to use the feature, process 200 can allow the content item to be uploaded but can reject use of the feature by the content creator. For example, in an instance in which process 200 determines that the content creator has not previously violated any policies associated with the media content platform but that the content creator is not eligible to use the feature due to other reasons (e.g., because the content creator does not have a sufficiently large audience, because the content creator has not previously uploaded more than a predetermined number of content items, and/or due to any other suitable reason), process 200 can allow the content item to be uploaded to the media content platform but can block or inhibit use of the feature by the content creator.

If, at 204, process 200 determines that the content creator is eligible to use the feature ("yes" at 204), process 200 can proceed to 208 and can determine whether to selectively bypass review of the user-generated content item. In some embodiments, process 200 can determine whether to bypass review of the content item based on any suitable information.

For example, in some embodiments, process 200 can determine whether review of the content item is to be bypassed based on a relative risk of publication of the content item if the content item includes objectionable content. In some embodiments, a relative risk of publication of the content item can be determined based on any suitable information, such as an expected size of an audience of the content item (e.g., a predicted number of people likely to view the content item), whether the content creator will receive any revenue from viewers of the content item, an expected revenue the content creator will receive from viewers of the content item, and/or any other suitable information. Note that, in some embodiments, process 200 can determine that the content item is to be assigned a relatively high risk score in response to determining that the content item satisfies any particular criteria. For example, in some embodiments, process 200 can determine that the content item is to be assigned a relatively high risk score in response to determining that the content item is being offered in exchange for payment by viewers (e.g., in instances in which the content item is exclusive content offered to users who pay for the content, in instances in which the content item is a perk that is being offered to users who pay for a membership to a channel of content, and/or any other suitable type of content).

In some embodiments, process 200 can determine a relative risk in any suitable manner. For example, in some embodiments, process 200 can identify multiple risk scores (e.g., a first risk score corresponding to an estimated audience size, a second risk score corresponding to an expected revenue for the content creator from viewers of the content item, and/or any other suitable risk scores), and can combine the multiple risk scores in any suitable manner (e.g., as a weighted average, and/or in any other suitable manner). As a more particular example, in an instance in which the content item corresponds to a video content item to be posted to a channel of content with a relatively large expected audience (e.g., based on the channel having more than a predetermined number of subscribers, based on the channel having more than a predetermined number of previous views of content associated with the channel, and/or based on any other suitable metric), process 200 can determine that the relative risk of publication of the content item is high. As another more particular example, in an instance in which the content item corresponds to a video content item that has been monetized in any suitable manner (e.g., due to insertion of advertisements, because the content item is being provided to users who have paid to receive the content item, and/or in any other suitable manner), process 200 can determine that the relative risk of publication of the content item is high. As yet another more particular example, in an instance in which the content item corresponds to a comment to be posted in a comments section, process 200 can determine that the relative risk of publication of the content item is low. In some embodiments, process 200 can determine that content items associated with a relative risk of publication that exceeds a predetermined threshold are to be manually reviewed (that is, not bypassed for manual review, or "no" at 208). Note that, in some embodiments, in an instance in which process 200 determines that a content item is associated with a relative risk of publication that exceeds a particular predetermined threshold, process 200 can determine that the content item is to be automatically rejected.

As another example, in some embodiments, process 200 can determine that review of the content item is to be bypassed in response to determining that the content item is similar to or matches previously uploaded content items that have previously been reviewed. As a more particular example, in some embodiments, process 200 can determine that the content item is similar to or matches content items that have been previously reviewed and approved. As another more particular example, in some embodiments, process 200 can determine that the content item is similar to or matches content items that have been previously reviewed and rejected.

Note that, in some embodiments, process 200 can determine whether the uploaded content item is similar to or matches previously reviewed content items using any suitable technique or combination of techniques. For example, in some embodiments, process 200 can compare one or more audio and/or video fingerprints of the uploaded content item to a database of previously uploaded content items to identify matches to previously uploaded and reviewed content items.

Additionally, note that, in some embodiments, process 200 can determine a degree of similarity required between the uploaded content item and at least one previously reviewed content item to determine that review is to be bypassed. For example, in some embodiments, process 200 can determine that the uploaded content item is to have at least a predetermined threshold of similarity to a previously reviewed content item (e.g., at least 70% similarity, at least 80% similarity, and/or any other suitable threshold) to determine that review is to be bypassed. In some embodiments, a predetermined threshold of similarity can be determined or set in any suitable manner. For example, in some embodiments, the predetermined threshold of similarity can be determined by process 200 such that, when the predetermined threshold of similarity is applied, a predetermined range of content items are sent for manual review. That is, in some embodiments, process 200 can adjust the predetermined threshold of similarity over time based on a number of content items that are uploaded to the media content platform, thereby allowing an amount of manual review that is performed to be adjusted.

Additionally, note that, in some embodiments, process 200 can determine whether manual review is to be bypassed based on any suitable combination of a relative risk of publication of the content item and a similarity between the uploaded content item and previously uploaded content items. For example, in some embodiments, process 200 can calculate a risk score indicating a relative risk of publication of the content item and a similarity score indicating a similarity between the content item and previously uploaded content items, and can determine whether manual review is to be bypassed based on both the risk score and the similarity score. As a more particular example, in some embodiments, process 200 can determine that manual review is not to be bypassed ("no" at 208) in response to determining that the risk score exceeds a first predetermined threshold and the similarity score is below a second predetermined threshold (that is, not sufficiently similar to a previously uploaded content item). As another more particular example, in some embodiments, process 200 can determine that manual review is to be bypassed ("yes" at 208) in response to determining that the risk score is below a first predetermined threshold and the similarity score is above a second predetermined threshold.

In some embodiments, process 200 can determine that particular types of content items are to be manually reviewed regardless of risk score. For example, in some embodiments, process 200 can determine that content items that are provided in exchange for payment by viewers of the content item (e.g., exclusive content that is provided to paying users, and/or any other suitable type of paid content) are always to be manually reviewed. As another example, in some embodiments, process 200 can determine that content items generated by content creators who are providing paid content for a first time are to be manually reviewed. Note that, in some embodiments, paid content items can include video content, audio content, "super stickers," "super comments," (as described above in connection with block 202) and/or any other suitable type of content that is made available to viewers in exchange for payment.

If, at 208, process 200 determines that review of the content item is to be bypassed ("yes" at 208), process 200 can proceed to 210 and can determine whether the content item is to be rejected as being abusive content. In some embodiments, process 200 can determine whether the content item is to be rejected based on whether it was determined at block 208 that the uploaded content item is similar to or matches a previously rejected content item. For example, in some embodiments, process 200 can determine that the uploaded content item is similar to or matches a previously rejected content item that was rejected due to the content item including one or more types of objectionable content, and, in some such embodiments, process 200 can determine that content item is to be rejected. As another example, in some embodiments, process 200 can determine that the uploaded content item is similar to or matches a previously approved content item, and, in some such embodiments, process 200 can determine that the content item is not to be rejected. As yet another example, in some embodiments, process 200 can determine a likelihood that the content item includes any particular types of objectionable content using any suitable technique(s). As a more particular example, in some embodiments, process 200 can use any suitable classifier or combination of classifiers to determine a likelihood that the content item includes objectionable content. Note that, in instances in which the content item corresponds to video content or audio content, process 200 can use a classifier that takes as inputs any suitable audio or video fingerprints of the content item. In some embodiments, in instances in which the content item corresponds to a submitted comment, process 200 can use a classifier that takes as an input any suitable text or links included in the comment to determine a likelihood that the text includes objectionable content or that the link is to a site associated with objectionable content. Continuing with this example, in some embodiments, process 200 can determine that the content item is to be rejected in response to determining that a determined likelihood that the content item includes objectionable content exceeds a predetermined threshold (e.g., greater than 70%, greater than 80%, and/or any other suitable threshold).

If, at 210, process 200 determines that the content item is to be rejected ("yes" at 210), process 200 can reject the content item at 206, as described above.

If, at 210, process 200 determines that the content item is not to be rejected ("no" at 210), process 200 can proceed to 212 and can post the content item to the media content platform. In some embodiments, process 200 can post the content item to the media content platform in any suitable manner. For example, in some embodiments, process 200 can upload the content item to a particular channel associated with the content creator. As another example, in some embodiments, process 200 can make a link to the content item available to other user devices to stream or download the content item. As another example, in some embodiments, process 200 can transmit a notification to the content creator indicating that the content item has been approved. In some such embodiments, the content creator can then initiate posting of the content item in any suitable manner, for example, by selecting any suitable selectable input that causes the content item to be made available to other viewers. As yet another example, in an instance in which the content item corresponds to a live-stream of content, process 200 can make the live-stream available to viewers after any suitable time delay (e.g., after thirty seconds, after one minute, and/or after any other suitable time delay). As still another example, in an instance in which the content item corresponds to a comment to be posted to a comments section or a chat, process 200 can cause the comment to be added to a chat or a comments section in any suitable manner (e.g., at the bottom of a chat, at a bottom of a comments section, in a pinned position of a chat or comments section, and/or in any other suitable manner).

Referring back to block 208, if, at 208, process 200 determines that review of the content item is not to be bypassed ("no" at 208), process 200 can proceed to 214 and can add the content item to a queue of content items to be reviewed. As described above in connection with block 104 of FIG. 1, in some embodiments, process 200 can add the content item to a queue of content items to be reviewed in any suitable manner. For example, in some embodiments, the content item can be added to the queue based on a date or a time the content item was received at block 202 (e.g., such that items that were received earlier are placed earlier in the queue, and/or in any other suitable manner). As another example, in some embodiments, the content item can be added to the queue based on a popularity of other content items associated with the content creator. As a more particular example, in some embodiments, a content item associated with a content creator who has previously uploaded content items that have received more than a predetermined number of views, shares, comments, etc. can be placed higher in the queue. As yet another example, in some embodiments, in an instance in which publication of the content item is time-sensitive (e.g., in an instance in which the content item is live-streamed content, in an instance in which the content item is a comment in a live chat, and/or in any other suitable time-sensitive context), process 200 can add the content item to a relatively high position within the queue (e.g., to a front of the queue, and/or in any other suitable position), thereby allowing the content item to be manually reviewed more quickly.

As described above in connection with FIG. 1, in response to the content item being moved to the head of the queue of content items to be reviewer, the content item can be assigned to a reviewer. In some such embodiments, as described above in connection with FIG. 1, the content item can be presented on a user device associated with the reviewer. In some embodiments, the reviewer can then use the user device associated with the reviewer to enter any information associated with a decision related to the content item, such as whether the content item is determined to include one or more types of objectionable content, frames or timestamps of the content item that include objectionable content in instances where the content item corresponds to a video or to audio content, one or more policies violated by the content item, and/or any other suitable information.

At 216, process 200 can receive a decision relating to the content item. In some embodiments, process 200 can receive the decision in any suitable manner. For example, in some embodiments, a server executing process 200 can receive a message from a user device associated with a reviewer who reviewed the content item. In some such embodiments, the message can include any suitable information, such as an indication that the content item does not violate any policies associated with the media content platform, an indication that the content item does violate one or more policies associated with the media content platform, an indication of one or more types of objectionable content included in the content item, timestamps of the content item that include one or more types of objectionable content, and/or any other suitable information.

At 218, process 200 can determine whether the decision indicates a policy violation.

If, at 218, process 200 determines that the decision does not indicate a policy violation ("no" at 218), process 200 can post the content item to the media content platform at 212, as described above.

If, at 218, process 200 determines that the decision does indicate a policy violation ("yes" at 218), process 200 can proceed to 220 and can transmit a message to the content creator indicating the policy violation. In some embodiments, process 200 can transmit the message to the content creator in any suitable manner. For example, in some embodiments, process 200 can transmit the message to an email address associated with the content creator. As another example, in some embodiments, process 200 can transmit the message in connection with a user account associated with the content creator and the media content platform. As a more particular example, in some embodiments, the message can be a notification that is presented on a home page of the user account associated with the content creator in connection with the media content platform. This can, for example, provide precise feedback to the content creator as to policy violation and other reasons for taking an action that inhibits the user-generated content from being made available on the media content platform.

In some embodiments, the message can include any suitable information. For example, in some embodiments, the message can indicate the one or more policies that the content item violates. As a more particular example, in some embodiments, the message can indicate that the content item includes one or more types of objectionable content that violate one or more policies of the media content platform. As another example, in some embodiments, the message can indicate one or more portions of the content item that violate the policy of the media content platform, using any suitable timing information, such as timestamps of the content item, frames of the content item, and/or any other suitable timing information. As yet another example, in some embodiments, the message can indicate a penalty. As a more particular example, in some embodiments, the message can indicate that the content item has been blocked from being uploaded to the media content platform. As another more particular example, in some embodiments, the message can indicate that the content creator will be prohibited from uploading content items for a predetermined duration of time (e.g., for a month, for 90 days, and/or for any other suitable duration of time). As yet another more particular example, in some embodiments, the message can indicate that an account associated with the content creator will be terminated. As still another more particular example, in some embodiments, the message can indicate that the content creator will not be allowed to use the feature for a predetermined duration of time (e.g., thirty days, ninety days, and/or any other suitable duration of time). As still another more particular example, in some embodiments, the message can indicate that the content creator will not be allowed to stream live content for a predetermined duration of time (e.g., thirty days, ninety days, and/or any other suitable duration of time). As still another more particular example, in an instance in which the content item corresponds to a comment to be posted to a chat or a comments section, the message can indicate that the user will not be allowed to post comments for a particular duration of time to the comments section associated with the rejected comment or to any comments section associated with the media content platform.

Note that, in some embodiments, process 200 can determine the penalty based on the policy violated by the content item. For example, in some embodiments, process 200 can determine the penalty based on a severity of the violation. As a more particular example, in some embodiments, process 200 can determine a first penalty (e.g., that the content item will be blocked) in response to determining that the policy violation corresponds to inclusion of a first type of objectionable content in the content item and a second penalty (e.g., that the user account associated with the content creator will be terminated) in response to determining that the policy violation corresponds to inclusion of a second type of objectionable content in the content item. Additionally, note that, in some embodiments, process 200 can determine that a particular penalty (e.g., account termination, prohibiting upload of content for a predetermined duration of time, and/or any other suitable penalty) is to be applied in response to determining that the content creator has violated one or more policies more than a predetermined number of times (e.g., more than three violations, more than five violations, and/or any other suitable number). This can, for example, discourage policy violation with increasingly severe enforcement actions. Additionally, note that, in some embodiments, process 200 can determine the penalty based on the type of content item. For example, in some embodiments, in instances in which the content item corresponds to upload of video content or audio content to be made available to other viewers, process 200 can identify a penalty associated with a temporary or permanent block of uploading of other video or audio content to the media content platform. As another example, in some embodiments, in instances in which the content item corresponds to a comment submitted to a chat or comments section, process 200 can identify a penalty associated with a temporary or permanent block of submission of comments.

Note that, in some embodiments, prior to proceeding to block 220, process 200 can add the content item to a second queue such that the content item is then reviewed for a second time by a second reviewer. That is, in some embodiments, in response to a determination that the decision indicates a policy violation, process 200 can cause the content item to be reviewed for a second time by a second reviewer who is different than the first reviewer to confirm that the content item does violate a policy of the media content platform.

At 222, process 200 can update an account associated with the content creator based on the policy violation. For example, in some embodiments, process 200 can update the account to indicate that the uploaded content item violated a particular policy. As another example, in some embodiments, process 200 can update the account to indicate that the uploaded content item was determined to include a particular type of objectionable content. As yet another example, in some embodiments, process 200 can update a tally that indicates a number of times the content creator has uploaded content items that have violated policies associated with the media content platform. Note that, in some embodiments, process 200 can use the information associated with the account of the content creator to determine a penalty for the content creator, as described above in connection with block 220.

At 224, process 200 can block the content item from upload to the media content platform. Note that, in instances where the content item is a live-stream of content, process 200 can stop or inhibit the live-stream from being streamed to any user devices.

Note that, although processes 100 and 200 are described above as relating to review of content items (e.g., videos, live-streamed video content, and/or any other suitable content item), in some embodiments, processes 100 and 200 can be used to review any other suitable type of content, such as comments in a comment section, comments in a social networking post, messages in a live chat, and/or any other suitable comments. For example, in some embodiments, process 200 can determine whether a particular comment is to be added to a queue of comments to be reviewed (e.g., at blocks 208 and 214) based on a classifier applied to a group of comments. As a more particular example, in some embodiments, process 200 can add a comment to a queue of comments to be manually reviewed in response to determining, using any suitable machine learning classifier, that the comment is likely to contain one or more types of objectionable content (e.g., hate speech, objectionable language, objectionable images or links, and/or any other suitable type of objectionable content). Continuing with this example, in some embodiments, process 200 can add the comment to the queue of comments to be reviewed (e.g., at block 214), and can proceed through the blocks of process 200 to determine whether the comment is to be removed from the live chat or comments section to which it was posted based on the manual review. As another example, in some embodiments, processes 100 and 200 can be used to review perks offered by a content creator in connection with purchase of a membership, as described above in connection with block 202. As a more particular example, in some embodiments, process 200 can determine whether a particular offered perk is to be added to a queue of perks to be reviewed (e.g., at block 208 and 214) based on any suitable information, such as whether complaints have been received by viewers who have purchased a membership, whether more than a predetermined threshold of viewers have canceled a purchased membership, and/or based on any other suitable criteria. Continuing with this example, process 200 can then proceed through the blocks of process 200 to determine whether the offer of the perk is to be canceled or discontinued based on the manual review.

Figure 3:
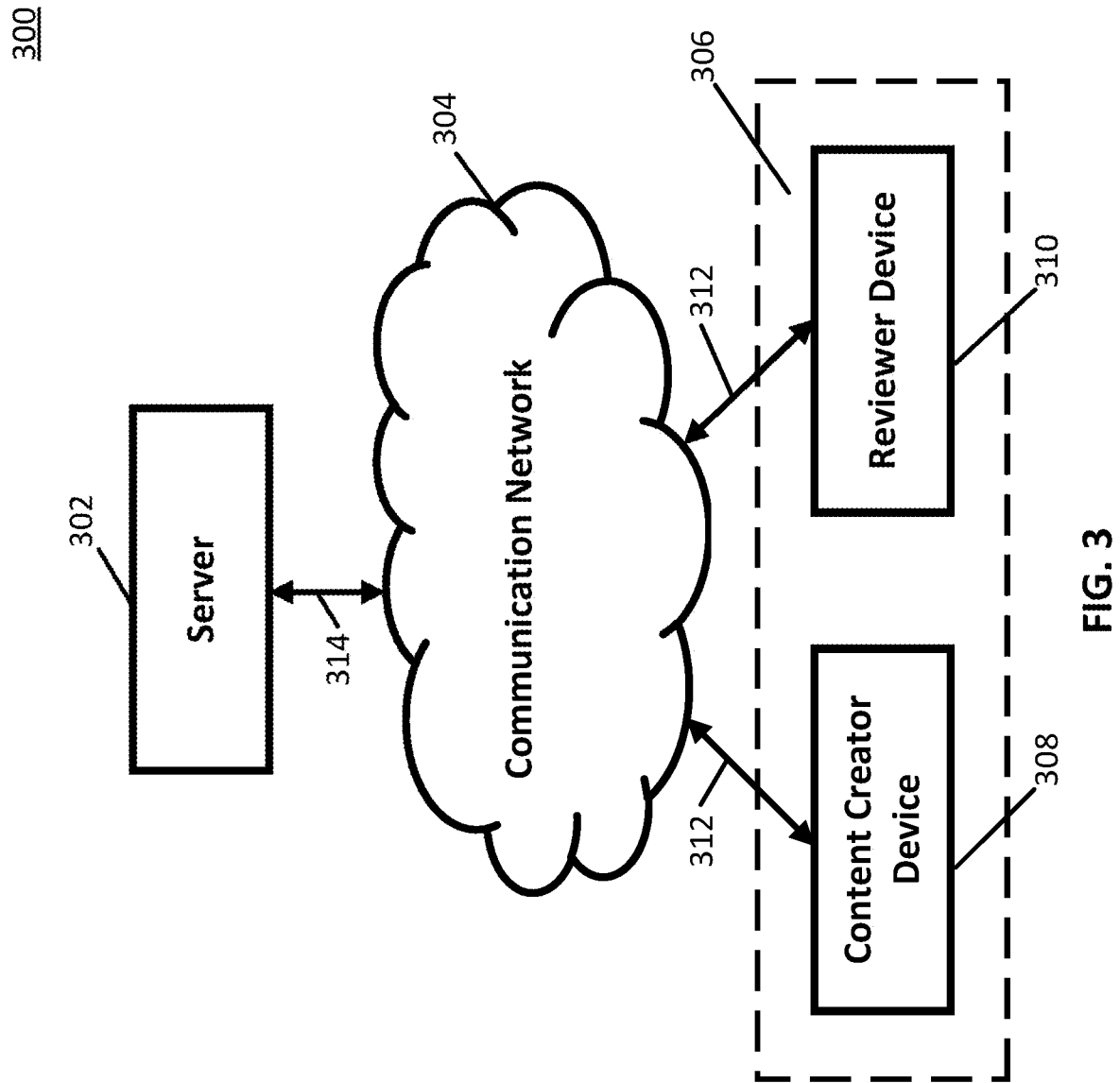
FIG. 3 shows a schematic diagram of an illustrative system suitable for implementation of mechanisms described herein for identifying abusive content items in accordance with some embodiments of the disclosed subject matter.

Turning to FIG. 3, an illustrative example 300 of hardware for identifying abusive content items that can be used in accordance with some embodiments of the disclosed subject matter is shown. As illustrated, hardware 300 can include a server 302, a communication network 304, and/or one or more user devices 306, such as a content creator device 308 and/or a reviewer device 310.

Server 302 can be any suitable server(s) for storing information, data, media content, and/or any other suitable type of content. For example, in some embodiments, server 302 can store user-generated media content uploaded by one or more content creator device 308. As a more particular example, in some embodiments, the user-generated media content can include videos, movies, photos, slideshows, animations, documents, and/or any other suitable user-generated media content. As another example, in some embodiments, server 302 can store information about one or more content creators that have uploaded user-generated content to server 302, such as whether a particular content creator has previously uploaded content that violates a particular policy of a media content platform, and/or any other suitable information. In some embodiments, server 302 can implement any suitable processes for queuing uploaded content items for review, storing a decision related to an uploaded content item (e.g., a decision indicating whether or not the content item contains objectionable content, and/or any other suitable decision), and/or performing any other suitable functions. For example, in some embodiments, server 302 can implement any suitable blocks of process 200, as shown in and described above in connection with FIG. 2.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links (e.g., communications links 312) to communication network 304 that can be linked via one or more communications links (e.g., communications links 314) to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices. For example, in some embodiments, user devices 306 can include content creator device 308. In some embodiments, content creator device 308 can be any user device suitable for capturing user-generated content, uploading user-generated content, receiving notifications indicating decisions related to an uploaded content item, and/or for performing any other suitable functions. As another example, in some embodiments, user devices 306 can include reviewer device 310. In some embodiments, reviewer device 310 can be any user device suitable for viewing an uploaded content item, transmitting a decision related to the uploaded content item, and/or performing any other suitable function(s). In some embodiments, user devices 306 can include any suitable types of user devices. For example, in some embodiments, user devices 306 can include a mobile phone, a wearable computer, a tablet computer, a desktop computer, a laptop computer, a vehicle entertainment system, a game console, a television, and/or any other suitable user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Figure 4:
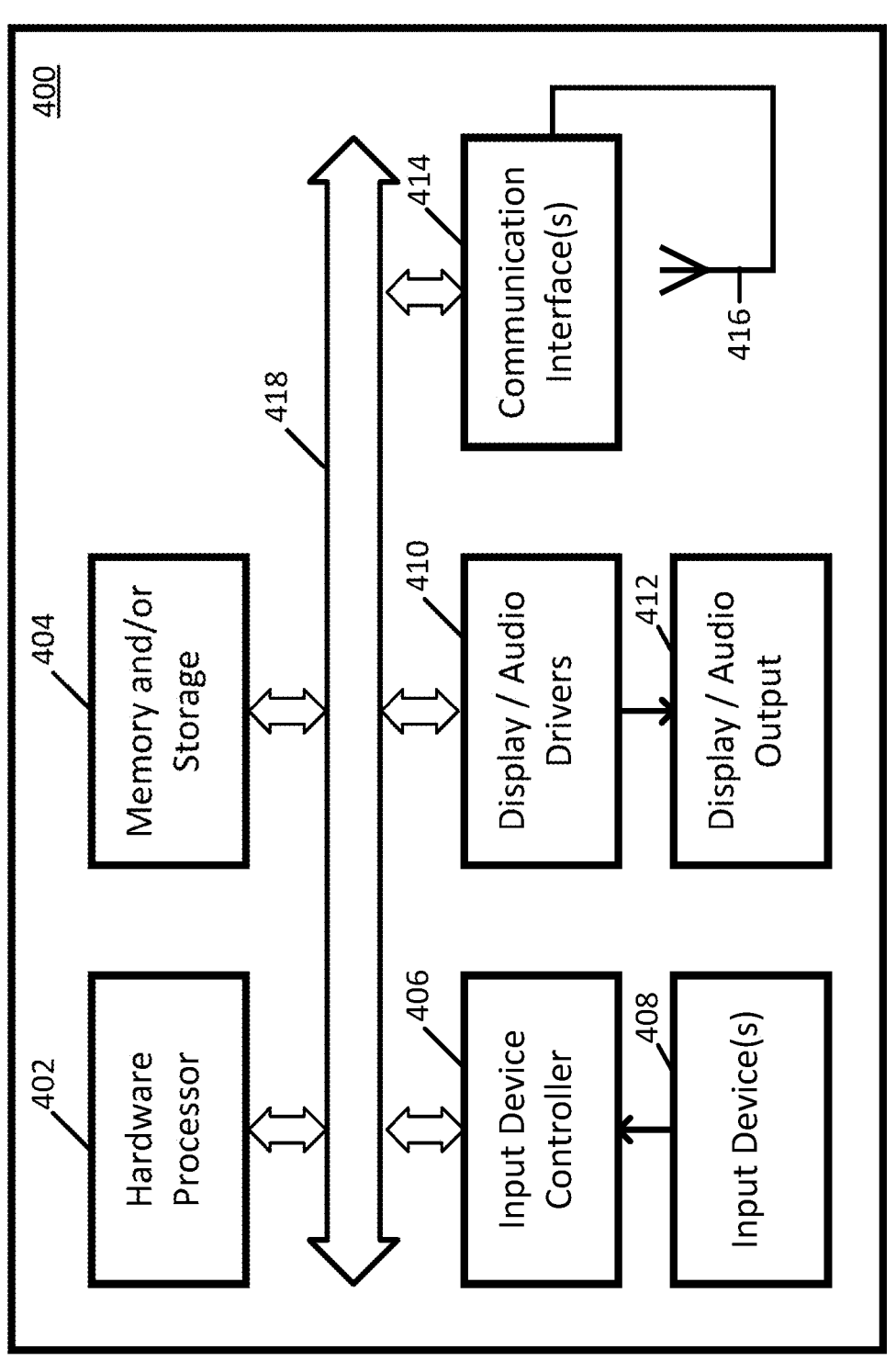
FIG. 4 shows a detailed example of hardware that can be used in a server and/or a user device of FIG. 3 in accordance with some embodiments of the disclosed subject matter.

Server 302 and user devices 306 can be implemented using any suitable hardware in some embodiments. For example, in some embodiments, devices 302 and 306 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a server program stored in memory and/or storage of a server, such as server 302. In some embodiments, hardware processor 402 can be controlled by a computer program stored in memory and/or storage 404 of user device 306.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for identifying abusive content items are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for identifying abusive content items, the method comprising:

receiving, at a server that includes a hardware processor, from a user device associated with a user, a request to provide user-generated content on a media content platform;

in response to receiving the request:

identifying second user-generated content that has been previously reviewed;

determining a similarity of the user-generated content to the second user-generated content; and determining whether the user-generated content is to be reviewed by one or more reviewing users by at least comparing the similarity to a similarity threshold indicated by one or more bypass criterion;

in response to determining that the user-generated content is to be reviewed based on the one or more bypass criterion, adding, using the hardware processor, a review request to a queue of the one or more of the reviewing users, wherein the review request includes the user-generated content and information associated with a user account corresponding to the user;

determining, using the hardware processor, whether a decision responsive to the review request indicates that the user-generated content is to be provided on the media content platform; and in response to determining that the decision indicates that the user-generated content violates at least one policy associated with the media content platform:

(i) determining, using a machine learning classifier, a type of objectionable content included in the user-generated content, (ii) transmitting a first message to the user of the user device that indicates the at least one policy and a penalty to be administered to the user account corresponding to the user, wherein the penalty is determined based on the type of objectionable content included in the user-generated content, and (iii) executing a corresponding action based on the penalty, wherein the corresponding action comprises determining a content feature associated with the media content platform that enables interaction between the user and viewers of the user-generated content, and controlling the media content platform to disable the content feature while permitting the user-generated content to be provided on the media content platform; and in response to determining that the decision indicates that the user-generated content does not violate the at least one policy associated with the media content platform, providing the user-generated content on the media content platform.

2. The method of claim 1, wherein determining whether the user-generated content is to be reviewed is performed further based on determining that the second user-generated content was removed from the media content platform.

3. The method of claim 2, wherein determining that the user-generated content is to be reviewed based on the one or more bypass criterion includes determining that the similarity between the user-generated content and the second user-generated content is less than an amount of similarity indicated by the similarity threshold.

4. The method of claim 1, wherein, in response to determining that the decision indicates that the user-generated content violates at least one policy associated with the media content platform, the method further comprises:

determining whether the user has violated one or more policies more than a predetermined threshold number of times; and responsive to determining that that the user has violated the one or more policies more than the predetermined threshold number of times, determining the penalty further based on a type of objectionable content included in other user-generated content previously provided by the user and determined to violate the one or more policies.

5. The method of claim 1, wherein determining whether the user-generated content is to be reviewed by one or more reviewing users by at least comparing the similarity to the similarity threshold indicated by the one or more bypass criterion includes:

determining whether the second user-generated content is associated with a particular type of objectionable content that is blocked from being presented in connection with a particular feature that is currently enabled for the user account associated with the user.

6. The method of claim 5, wherein the particular type of objectionable content includes clickbait content, wherein the particular feature enables the user to collect revenue, and wherein the penalty includes blocking use of the particular feature by the user account of the user.

7. The method of claim 1, wherein the second user-generated content is identified based on:

determining that the second user-generated content was previously uploaded to the media content platform in connection with the user account of the user; and determining whether the second user-generated content passed or failed a previous content review.

8. The method of claim 1, further comprising:

receiving, at the server from the user device associated with the user, a subsequent request to provide third user-generated content on the media content platform; and determining that the third user-generated content is to be reviewed based on:

identifying the user-generated content that violated the at least one policy as being similar to the third user-generated content; and determining that the third user-generated content includes a same type of objectionable content as the user-generated content that violated the at least one policy.

9. The method of claim 8, further comprising:

determining whether a decision responsive to a review of the third user-generated content indicates that the third user-generated content does not violate any policies; and in response to determining that the third user-generated content includes the same type of objectionable content but does not violate any policies:

causing the third user-generated content to be provided for display to a plurality of other users of the media content platform on a content page associated with the user account of the user, and blocking inclusion of a viewer interaction on the content page that includes the third user-generated content.

10. The method of claim 1, wherein the user is a viewer and wherein the request to provide the user-generated content includes a request to use a content feature that enables interaction with a content creator.

11. The method of claim 1, further comprising:

adjusting the similarity threshold based on one or more queue loads associated with the one or more reviewing users.

12. The method of claim 1, wherein the user is a content creator and wherein the request to provide the user-generated content includes a request to use a content feature to create user-generated content.

13. The method of claim 1, wherein the second user-generated content is identified as being similar to the user-generated content based on comparing audio footprints associated with the user-generated content and the second user-generated content.

14. The method of claim 1, wherein the user is a content creator, and wherein the corresponding action includes blocking use of content features that allow interaction with the content creator by viewers of the user-generated content on a page of the media content platform that includes the user-generated content.

15. The method of claim 1, wherein the user is a viewer, wherein the request to provide the user-generated content on the media content platform is a request to provide a comment on a page of the media content platform that includes the second user-generated content, and wherein the second user-generated content corresponds to content targeted at children.

16. The method of claim 1, wherein the request to provide the user-generated content on the media content platform includes a request to use a particular content feature to generate the user-generated content and wherein the second user-generated content is identified as being similar to the user-generated content based on being created using the particular content feature.

17. The method of claim 16, wherein the second user-generated content is identified as being similar to the user-generated content further based on being created by the user of the user account using the particular content feature.

18. The method of claim 1, wherein the request to provide the user-generated content on the media content platform includes a request to use a particular content feature to generate the user-generated content and wherein the second user-generated content is identified as being similar to the user-generated content based on the information associated with the user account that requested to generate the user-generated content using the particular content feature.

19. A system for identifying abusive content items, the system comprising:

a server having memory; and a hardware processor that is configured to:

receive, at the server and from a user device associated with a user, a request to provide user-generated content on a media content platform;

in response to receiving the request:

identify second user-generated content that has been previously reviewed;

determine a similarity of the user-generated content to the second user-generated content; and determine whether the user-generated content is to be reviewed by one or more reviewing users by at least comparing the similarity to a similarity threshold indicated by one or more bypass criterion;

in response to determining that the user-generated content is to be reviewed based on the one or more bypass criterion, add a review request to a queue of the one or more of the reviewing users, wherein the review request includes the user-generated content and information associated with a user account corresponding to the user;

determine whether a decision responsive to the review request indicates that the user-generated content is to be provided on the media content platform; and in response to determining that the decision indicates that the user-generated content violates at least one policy associated with the media content platform:

(i) determine, using a machine learning classifier, a type of objectionable content included in the user-generated content, (ii) transmit a first message to the user of the user device that indicates the at least one policy and a penalty to be administered to the user account corresponding to the user, wherein the penalty is determined based on the type of objectionable content included in the user-generated content, and (iii) execute a corresponding action based on the penalty, wherein the corresponding action comprises determining a content feature associated with the media content platform that enables interaction between the user and viewers of the user-generated content, and controlling the media content platform to disable the content feature while permitting the user-generated content to be provided on the media content platform; and in response to determining that the decision indicates that the user-generated content does not violate the at least one policy associated with the media content platform, provide the user-generated on the media content platform.

20. A non-transitory computer-readable medium containing computer executable instructions that, when executed by a processor, cause the processor to:

receive, at a server and from a user device associated with a user, a request to provide user-generated content on a media content platform;

in response to receiving the request:

identify second user-generated content that has been previously reviewed;

determine a similarity of the user-generated content to the second user-generated content; and determine whether the user-generated content is to be reviewed by one or more reviewing users by at least comparing the similarity to a similarity threshold indicated by one or more bypass criterion;

in response to determining that the user-generated content is to be reviewed based on the one or more bypass criterion, add a review request to a queue of the one or more of the reviewing users, wherein the review request includes the user-generated content and information associated with a user account corresponding to the user;

determine whether a decision responsive to the review request indicates that the user-generated content is to be provided on the media content platform; and in response to determining that the decision indicates that the user-generated content violates at least one policy associated with the media content platform:

(i) determine, using a machine learning classifier, a type of objectionable content included in the user-generated content, (ii) transmit a first message to the user of the user device that indicates the at least one policy and a penalty to be administered to the user account corresponding to the user, wherein the penalty is determined based on the type of objectionable content included in the user-generated content, and (iii) execute a corresponding action based on the penalty, wherein the corresponding action comprises determining a content feature associated with the media content platform that enables interaction between the user and viewers of the user-generated content, and controlling the media content platform to disable the content feature while permitting the user-generated content to be provided on the media content platform; and in response to determining that the decision indicates that the user-generated content does not violate the at least one policy associated with the media content platform, provide the user-generated content on the media content platform.

\* \* \* \* \*